Oct. 12, 1954
D. STEVENS ET AL
2,691,314
GANG APPARATUS FOR TIGHTENING A PLURALITY
OF THREADED FASTENING ELEMENTS
Filed July 17, 1951
7 Sheets-Sheet 1
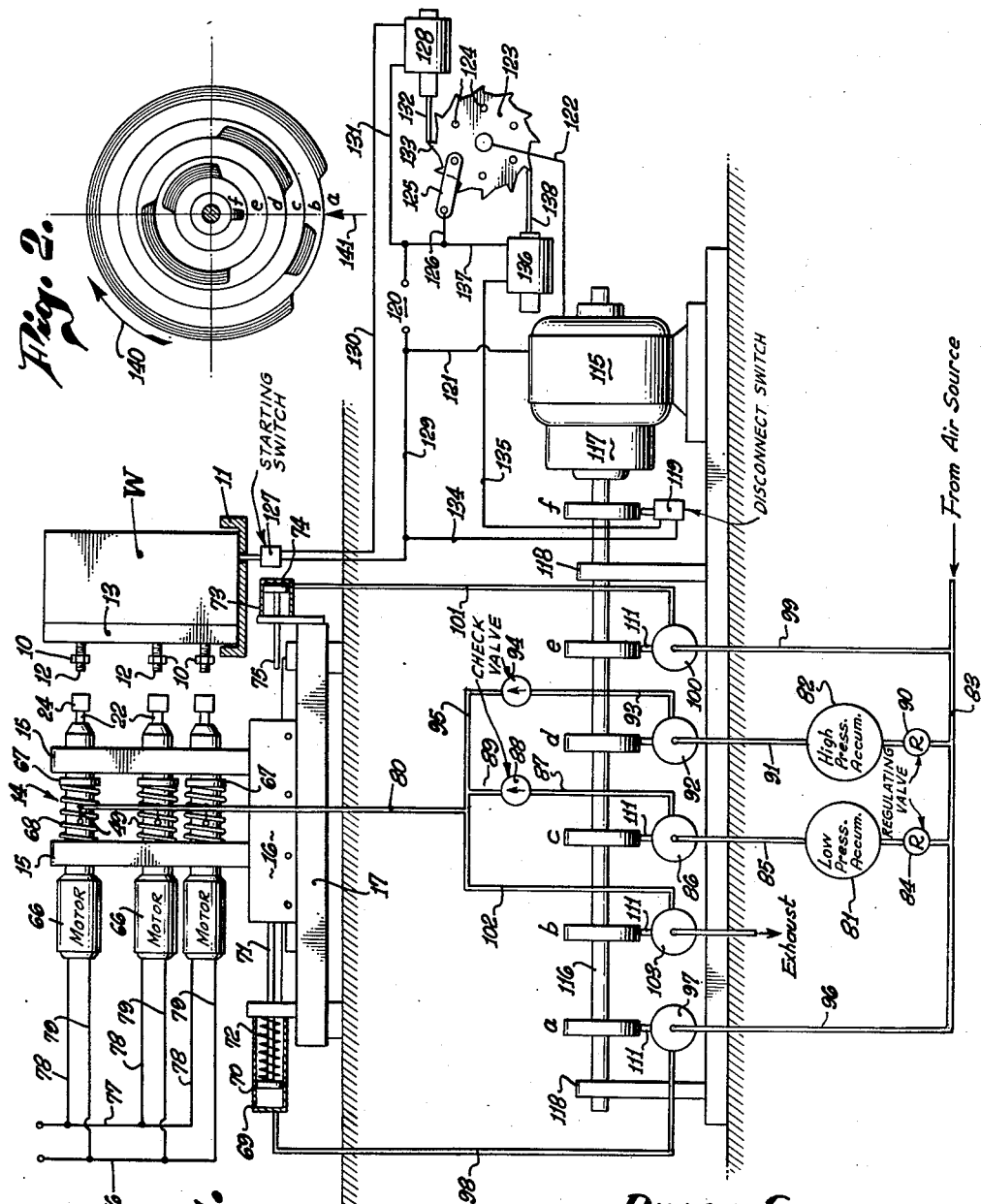
DILLON STEVENS,
HENRY T. M. RICE,
ROBERT T. STEVENS,
INVENTORS.
BY Bernard Kriegel
ATTORNEY.

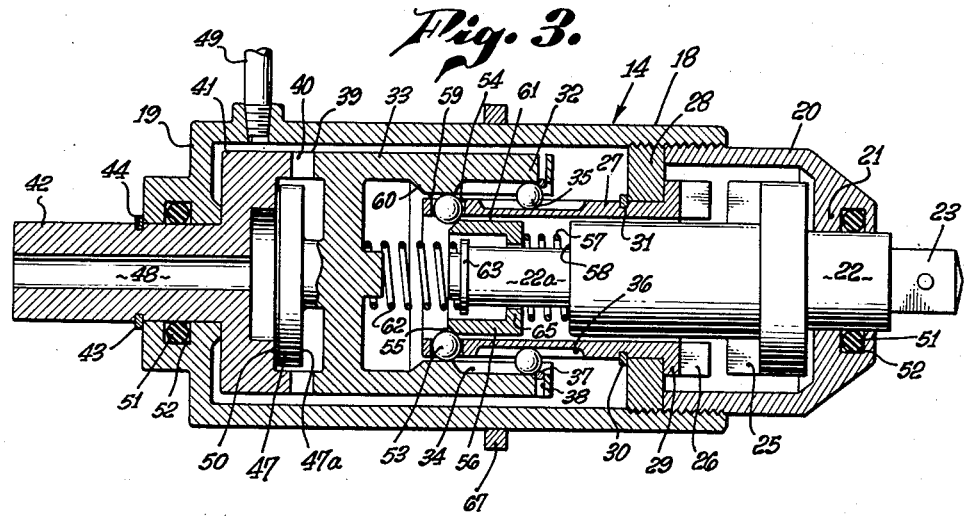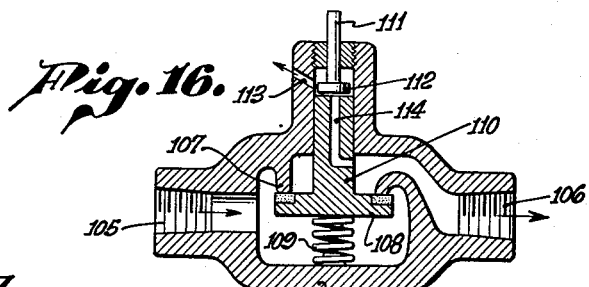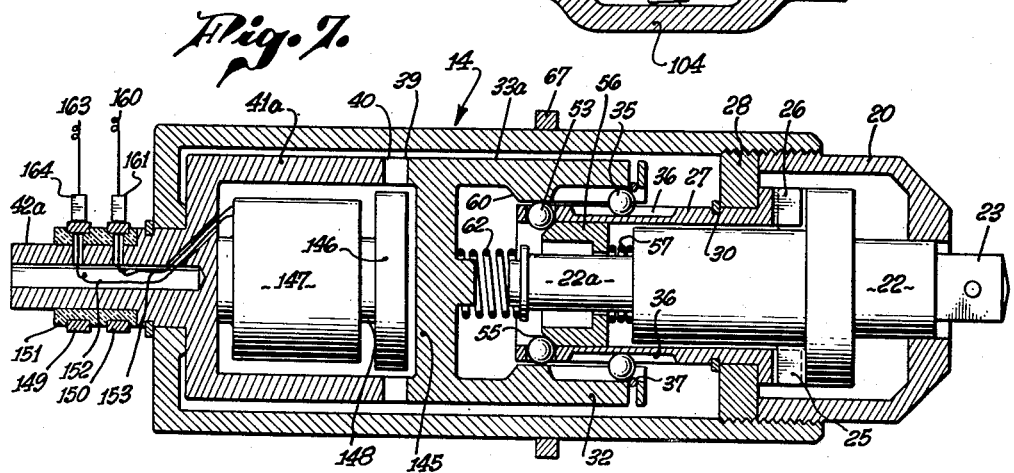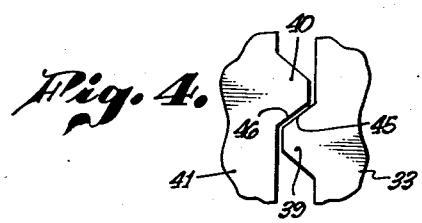

Oct. 12, 1954

D. STEVENS ET AL 2,691,314

GANG APPARATUS FOR TIGHTENING A PLURALITY
OF THREADED FASTENING ELEMENTS

Filed July 17, 1951

DILLON STEVENS,
HENRY T. M. RICE,
ROBERT T. STEVENS,
INVENTORS.

BY

Bernard Kriegel

ATTORNEY.

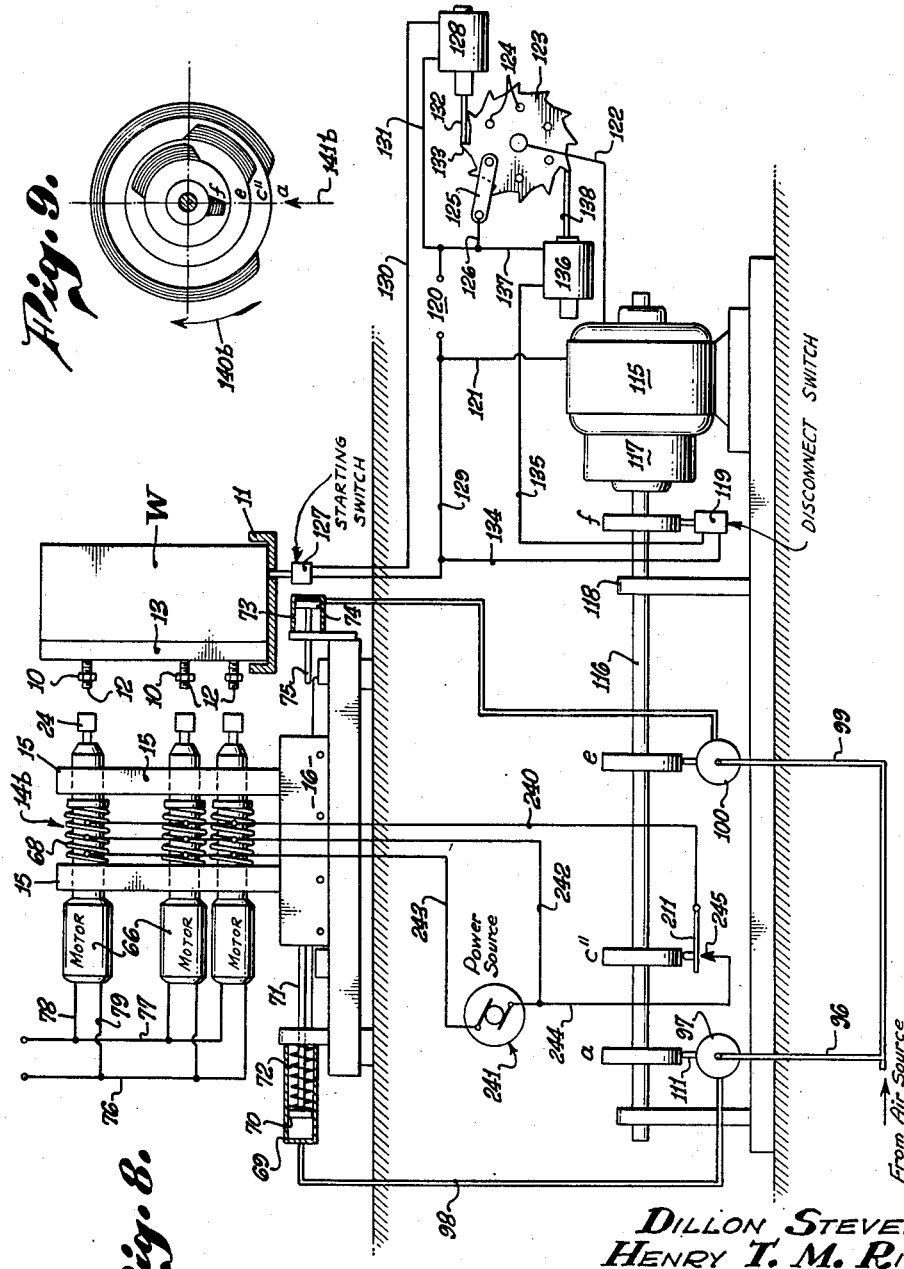

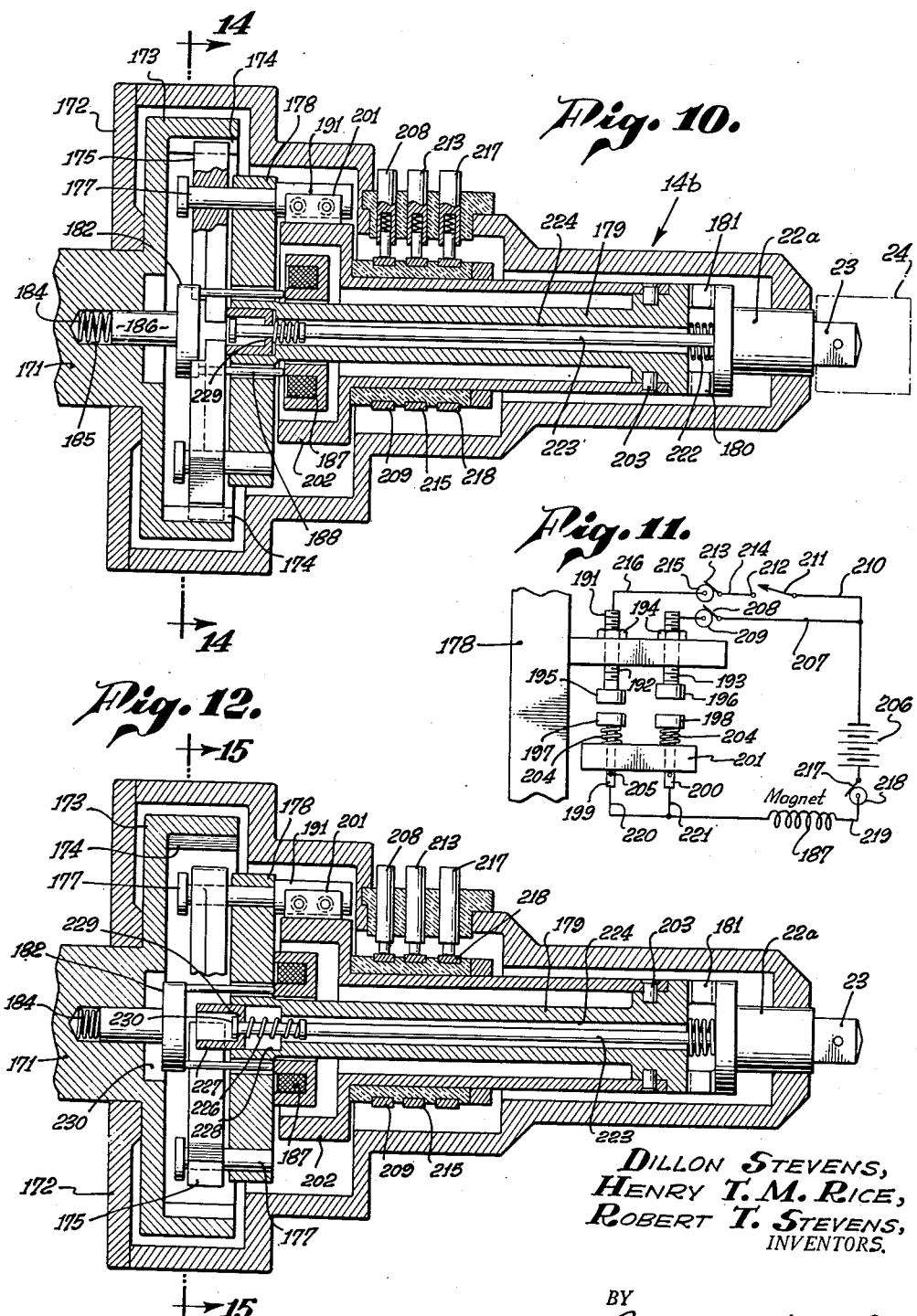

Oct. 12, 1954 D. STEVENS ET AL 2,691,314
GANG APPARATUS FOR TIGHTENING A PLURALITY
OF THREADED FASTENING ELEMENTS
Filed July 17, 1951 7 Sheets-Sheet 6
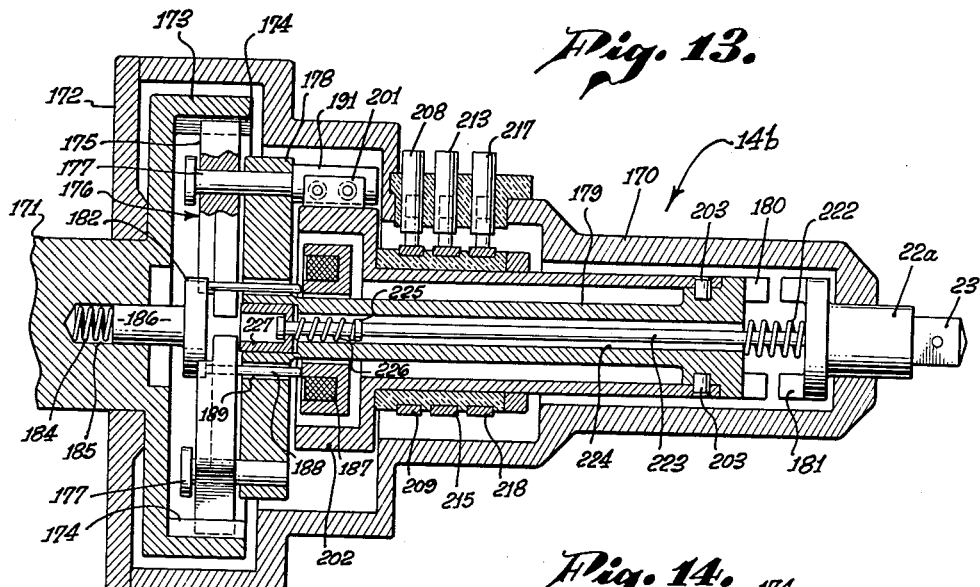
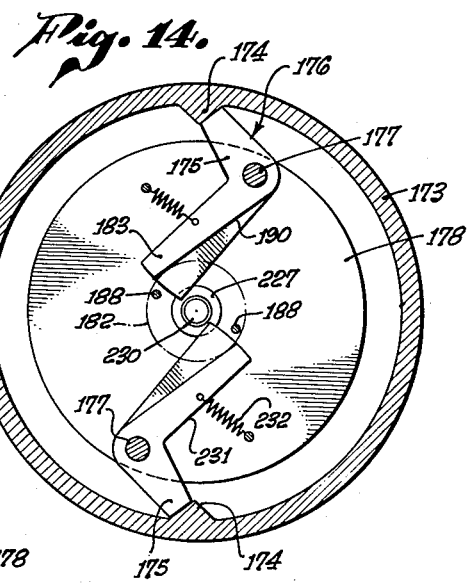
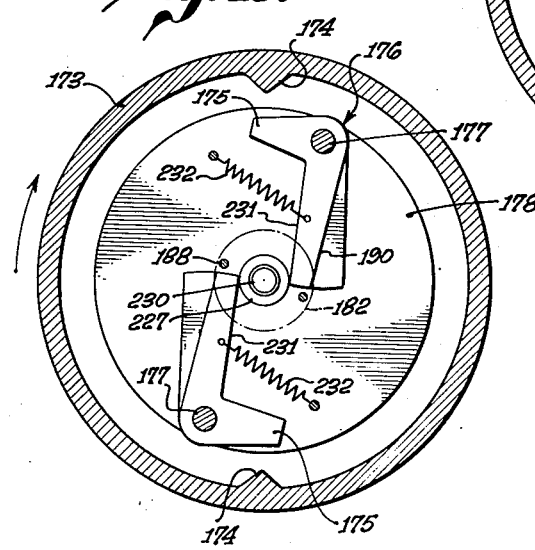
DILLON STEVENS,
HENRY T. M. RICE,
ROBERT T. STEVENS,
INVENTORS
BY Bernard Kriegel
ATTORNEY.

DILLON STEVENS,
HENRY T. M. RICE,
ROBERT T. STEVENS,
INVENTORS.

BY
Bernard Kriegel
ATTORNEY.

Patented Oct. 12, 1954

2,691,314

UNITED STATES PATENT OFFICE 2,691,314

GANG APPARATUS FOR TIGHTENING A PLURALITY OF THREADED FASTENING ELEMENTS

Dillon Stevens, Los Angeles, Henry T. M. Rice, San Marino, and Robert T. Stevens, Altadena, Calif.; said Rice and said Robert T. Stevens assignors to said Dillon Stevens Application July 17, 1951, Serial No. 237,204

19 Claims. (Cl. 81—52.4)

The present invention relates to apparatus for tightening a group of threaded fastening elements at the same time.

It is highly desirable to tighten a plurality of threaded fastening elements holding two or more parts together at the same time. One advantage is the economical aspect of saving time, especially in mass production operations. Another important advantage lies in the fact that distortions in the parts can be avoided if each fastening element carries its proper share of the load. Apparatus has been proposed for simultaneously rotating threaded fastening elements, but such elements have been tightened to non-uniform torques. As a practical matter, it is virtually impossible to tighten all fastening elements to the same extent and at the same instant of time. In using gang apparatus, one threaded fastening element will tighten before another, and, when the latter has been tightened, it relieves the first tightened element of part of the load to which it had been subjected previously; so that the first element is insufficiently tight, and may, in fact, be loose. The net result is the non-uniform and inadequate securing of the parts together, which, in some cases, might result in their distortion. One remedy is to re-tighten the loose elements, but when this is done, other elements are relieved of a portion of their load and become inadequately tightened.

Accordingly, it is an object of the present invention to provide gang apparatus capable of simultaneously operating upon a plurality of threaded fastening elements, to tighten all of such elements to substantially the same predetermined torque.

Another object of the invention is to provide apparatus for initially and substantially simultaneously tightening a plurality of threaded fastening elements, release the driving efforts from the elements, and then reapply the driving effort thereto, to insure that all of the fastening elements have been tightened to the desired and predetermined torque value.

A further object of the invention is to provide apparatus for tightening a plurality of threaded fastening elements by substantially simultaneously imparting progressively higher torques thereon, to insure that all of the elements will be tightened to substantially the same final torque.

Another object of the invention is to provide improved apparatus capable of initially partially tightening a group of threaded fastening elements and then imposing a greater torque or turning effort on such elements. In this connection, the elements are operated upon simultaneously, to insure that all of them will be tightened to the desired predetermined and final torque value substantially simultaneously, thereby minimizing, if not eliminating entirely, distortions in the work to which the elements are applied.

Yet a further object of the invention is to provide an apparatus capable of substantially simultaneously rotating a plurality of threaded fastening elements, to tighten them to a predetermined torque value, and of then substantially simultaneously reapplying the turning effort to the elements to insure their tightened condition.

Still another object of the invention is to provide gang torque transmitting apparatus for operating simultaneously on an irregular pattern of threaded fastening elements, to tighten them in stages to a predetermined final torque value.

A further object of the invention is to provide gang apparatus capable of simultaneously rotating a plurality of threaded fastening elements and automatically releasing the turning effort applied to each element upon its being tightened to a predetermined torque, the apparatus being reapplied to the elements after they have all been tightened to the predetermined torque to again operate upon them simultaneously, the turing effort reapplied to each of the elements again being automatically released upon its being tightened to the same or a higher predetermined torque, depending upon the adjustment of the apparatus.

Still a further object of the invention is to provide fluid controlled gang apparatus for simultaneously rotating a plurality of threaded fastening elements and for automatically releasing the turning effort applied to each element upon its being tightened to a predetermined torque, in which the torque at which the turning effort is released can be varied by varying the fluid pressure differential to which the apparatus is subjected.

Another object of the invention is to provide fluid controlled gang apparatus for simultaneously rotating a plurality of threaded fastening elements and for automatically releasing the turning effort applied to each element upon its being tightened to a predetermined torque, whereupon the fluid pressure differential to which the apparatus is subjected is automatically increased to effect substantially simultaneous retightening of the elements to a higher predetermined torque value upon reapplication of the apparatus to the elements.

Still another object of the invention is to provide magnetically controlled gang apparatus for simultaneously rotating a plurality of threaded fastening elements and for automatically releasing the turning effort applied to each element upon its being tightened to a predetermined torque, in which the torque at which the turning effort is released can be varied by varying the magnetic force to which the apparatus is subjected.

Yet another object of the invention is to provide magnetically controlled gang apparatus for simultaneously rotating a plurality of threaded fastening elements and for automatically releasing the turning effort applied to each element upon its being tightened to a predetermined torque, whereupon the magnetic force to which the apparatus is subjected is automatically increased to effect substantially simultaneous retightening of the elements to a higher predetermined torque value upon reapplication of the apparatus to the elements.

Still a further object of the invention is to insure the proper coupling engagement of gang apparatus with a plurality of threaded fastening elements when the apparatus and plurality of elements are moved relatively toward each other.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a diagrammatic view of one form of apparatus embodying the invention;

Fig. 2 is a timing diagram illustrating the sequence of events occurring in the apparatus disclosed in Fig. 1;

Fig. 3 is a longitudinal section through one of the fluid controlled, releasable torque transmitting devices embodied in the apparatus shown in Fig. 1;

Fig. 4 is a view of the releasable primary clutch teeth forming part of the device shown in Fig. 3;

Fig. 5 is a diagrammatic view of another embodiment of apparatus exemplifying the invention;

Fig. 6 is a timing diagram illustrating the sequence of events occurring in the apparatus shown in Fig. 5;

Fig. 7 is a longitudinal section through an electromagnetic torque releasing device employed in the apparatus shown in Fig. 5;

Fig. 8 is a diagrammatic view of still another embodiment of the apparatus;

Fig. 9 is a timing diagram illustrating the sequence of events occurring in the apparatus illustrated in Fig. 8;

Fig. 10 is a longitudinal section through a torque transmitting device employed in the apparatus disclosed in Fig. 8, the parts of the device being shown in driving position;

Fig. 11 is an enlarged, somewhat diagrammatic view of the electrical circuit for the device shown in Fig. 10;

Fig. 12 is a view similar to Fig. 10, illustrating the primary clutch portion of the device released;

Fig. 13 is a view similar to Fig. 10, illustrating the primary clutch portion of the device reengaged and the secondary clutch portion of the device released;

Fig. 14 is a cross-section taken along the line 14—14 on Fig. 10;

Fig. 15 is a cross-section taken along the line 15—15 of Fig. 12;

Fig. 16 is a longitudinal section through one of the control valves embodied in the systems and apparatus disclosed in Figs. 1, 5 and 8;

Figure 17:
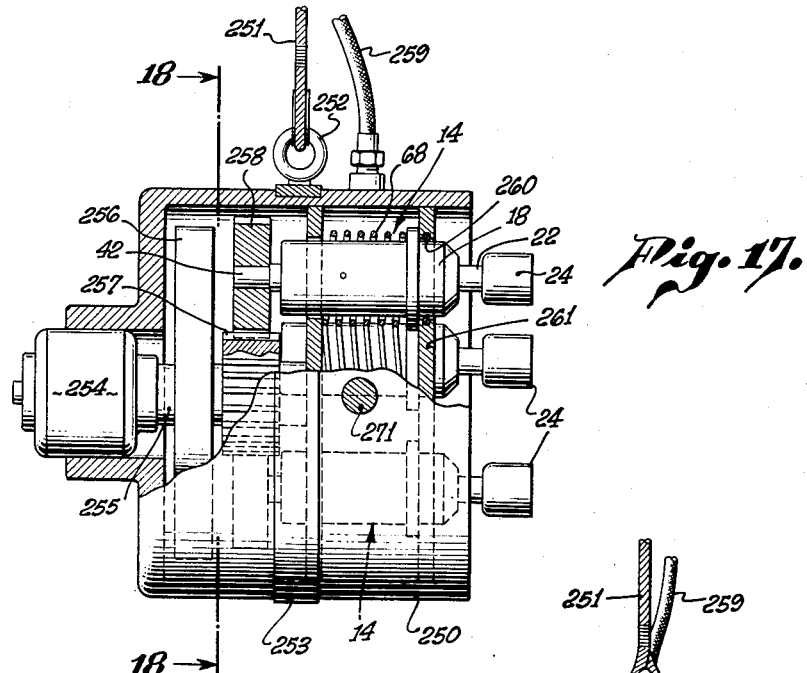
Fig. 17 is a longitudinal section, with parts shown in elevation, of still another embodiment of the invention.

In its general aspects, the invention contemplates apparatus which insures the uniform and substantially simultaneous tightening of a plurality of threaded fastening elements to their ultimate or final predetermined torque values. Inasmuch as it is practically impossible to simultaneously rotate a plurality of threaded fastening elements and have them reach a tightened state at the same instant of time, it is proposed to rotate the threaded fastening elements simultaneously and tighten them to a particular degree. As each element reaches such particular degree of tightness, the driving effort that has been imparted thereto may be released. After all of the threaded fastening elements have thus been brought to a supposed state of tightness, it would probably be found that some of the elements have not been tightened to the same torque value. However, all of the elements have effectively been bottomed or brought into close holding engagement against the work. Accordingly, a reapplication of the apparatus to the threaded fastening elements and the reimposition of the torque simultaneously thereon will then bring all of the threaded elements to the desired degree of tightness, with assurance that they will all be tightened to the proper torque value within a reasonable and small margin of error.

In a more limited sense, the apparatus is capable of tightening a plurality of threaded fastening elements in stages. The apparatus is first adjusted to release from each threaded fastening element as the latter is tightened to an initial torque which is substantially less than the desired final torque value. After all of the elements have thus been rotated and tightened to the initial torque value, the apparatus is adjusted to tighten the elements and to be released therefrom at a higher torque value. Simultaneous application of such higher torque value to all of the threaded fastening elements will insure that all of such elements will be tightened to the desired value, and that none of them will become loose.

If desired, more than two stages of torque tightening can occur through suitable adjustment of the apparatus which operates simultaneously upon all of the threaded fastening elements. Thus, the apparatus may be adjusted to simultaneously impart turning effort or torque to all of the threaded fastening elements, the turning effort being released from each element when the latter has been tightened to a relatively low torque value. Following release of the turning effort from all of the elements, the apparatus is set to apply a greater torque to all of the elements, which turning effort will be released from each element when it has been tightened to such greater torque. When this occurs, the apparatus can again be set to tighten all of the elements to still a greater or higher torque value, release of the turning effort again taking place from each element as it reaches the higher torque value. This procedure can be continued until the desired final torque value has been reached, with assurance that all of the threaded fastening elements will have been tightened to this particular value.

In the form of invention illustrated in Figs. 1 to 4, inclusive, a gang apparatus is disclosed for tightening a plurality of threaded fastening elements 10. In Fig. 1, the work W is illustrated as being carried on a suitable conveyor 11. This work has threaded shafts or studs 12 extending from it, and it is desired to tighten a plurality of threaded fastening elements 10, in the form of nuts, on such studs, to clamp a head or plate 13 against the main body portion of the work. The conveyor 11 moves the work W, being brought to rest with the nuts 10 in axial alignment with automatically releasable torque wrenches 14, which are suitably carried by a plurality of standards or supports 15 secured to a slide member 16 that is movable along a stationary frame 17. The slide member is movable along the frame, to shift the torque releasing devices 14 to and from the work; to enable the nuts 10, or other threaded fastening elements, to be rotated and tightened to the desired torque value.

The apparatus illustrated in Fig. 1 may utilize a form of torque wrench such as disclosed in Figs. 3 and 4. This wrench includes an elongated casing or housing 18 having a rearward end wall 19 and a forward cup-shaped end closure 20 threadedly secured in the forward end of the casing 18. The outer end portion 21 of the cup-shaped closure 20 may form a bearing support for a spindle 22 rotatably mounted therein, and having a non-circular end portion 23 extending outwardly thereof on which a socket wrench head 24 (see Fig. 1) may be mounted, of the proper size and shape to fit the nut 10 that is to be tightened on the work W. The spindle 22 extends inwardly of the casing 18 to a substantial extent, and has secondary driven clutch teeth 25 thereon that can be brought into engagement with secondary driving clutch teeth 26 mounted on a driven spline member 27, which is rotatable in a bearing ring 28 threaded into the casing 18 and clamped thereto by the cup-shaped closure 20. Axial or endwise movement of the driven spline member 27 is prevented by engagement of the outwardly directed flange portion 29 of the spline member with one face of the bearing ring 28, and by engagement of a split snap ring 30 with the opposite face of the bearing ring 28, which snap ring is mounted within a peripheral groove 31 in the driven spline member.

Rotation of the driven spline member 27 is obtained from the driving spline portion 32 of a driven clutch member 33 forming part of a primary torque releasable clutch. The driving spline member 32 has a plurality of longitudinally extending grooves 34 in its inner portion receiving balls 35 which are also rollable along companion longitudinally extending grooves or keyways 36 in the driven spline member 27. It is evident that the balls 35 serve to transmit the motion of the driving spline member 32 to the driven spline member 27. These balls are prevented from coming out of the driving spline member grooves or keyways 34 by a split stop ring 37 that may be positioned in a peripheral groove 38 in the driving spline member 32 and entering partly into the longitudinal grooves 34 of the driving spline member.

The driven member 33 of the primary clutch has a plurality of axially extending teeth 39 that are engageable by companion axially extending teeth 40 on the driving member 41 of the primary clutch, which may be formed integrally with a drive shaft 42 extending through the end wall 19 of the casing. The driving clutch member 41 may engage the inner end of the wall 19 to prevent its axial movement within the casing in one direction, axial movement of the driving member 41 and drive shaft 42 in the opposite direction being prevented by a snap ring 43 engaging the outer surface of the end wall 19 and disposed within a peripheral groove 44 in the drive shaft.

It is to be noted that the coengaging faces 45, 46 of the clutch teeth 40, 39 are inclined; so that a component of force is present during transmission of the turning effort from the driving clutch member 41 to the driven clutch member 33 tending to shift the latter axially away from the driving member. Such separating tendency is prevented, until a predetermined torque transmitting value is reached, by a holding device that maintains the clutch teeth in coupling engagement with one another. As disclosed in Fig. 3, the holding device includes a valve head or piston 47 integral with the driven clutch member 33 and engageable with the driving clutch member 41 to close an exhaust passage 48 through the latter, which may communicate with the atmosphere. A suitable fluid, such as air under pressure, may be introduced into the casing 18 through an inlet pipe or line 49 for action upon the valve head 47, holding it against its companion seat 50 on the driving clutch member 41 and preventing the air under pressure from exhausting from the casing through the outlet 48. Leakage from the casing is prevented by suitable rubber, or rubber-like, seal rings 51 mounted in grooves 52 in the end wall 19 and end closure 20 and engaging the peripheries of the drive shaft 42 and spindle 22.

The air under pressure within the casing 18 acts upon the inner face 47a of the valve head 47, to hold it against its seat 50 and also to hold the driven clutch teeth 39 in engagement with the driving clutch teeth 40. The driving member 41 may transmit its turning effort or torque to the driven member 33, and the air under pressure will act on the head 47 to maintain such engagement until the longitudinal component of force between the inclined clutch teeth 39, 40 exceeds the fluid pressure force holding the head 47 against its companion seat 50. When this higher value is reached, the head 47 is moved off its seat 50, allowing the air under pressure within the casing to exhaust through the outlet 48, and causing the driving cam teeth 40 to shift the driven cam teeth 39 and the driven member 33 axially to the extent in which its teeth 39 are out of the path of rotation of the driving teeth 40. The primary clutch 41, 33 is thus disengaged; so that no effort or motion is being imparted to the driven clutch member 33.

As indicated above, the rotation of the driven clutch member 33 is transmitted to the driven spline member 27 through the intervening anti-friction ball elements 35. When the spindle 22 is moved inwardly of the casing 18, the driving and driven clutch teeth 26, 25 of the secondary clutch are engaged to transmit the motion of the driven spline member 27 to the spindle 22 and from the spindle through the socket wrench head 24 to the nut 10 to be tightened. When the nut 10 has been tightened to the predetermined torque value, the primary clutch teeth 39, 40 are disengaged in the manner described above, and it is desired to hold the primary clutch in disengaged position until reengagement of the primary clutch cam teeth 39, 40 and relocation of the valve head 47 against its companion seat 50 is again desired.

The device for holding the driven primary clutch member 33 disengaged from the driving member 41 includes a plurality of latch balls 53 located in radial holes 54 in the driven spline member 27. These balls 53 are urged outwardly of the driven spline member by an upper tapered cam face 55 on the end of a latch cam and retainer sleeve 56 surrounding a reduced diameter portion 22a of the spindle 22. An actuating spring 57 bears upon a spindle shoulder 58 and the retainer sleeve 56, to urge the cam face 55 of the latter against the balls 53, tending to force the latter radially outward. When the primary clutch teeth 45, 46 are engaged, the latch balls 53 engage an inner cylindrical surface 59 on the driven clutch member 33, and are ineffective to perform any latching function. However, upon longitudinal or axial shifting of the driven clutch member 33 to its released position, when a predetermined torque transmitting value has been reached, a tapered shoulder 60 on the driven member 33 becomes located forwardly of the balls 53, allowing the cam surface 55 on the sleeve 56 to project the balls 53 outwardly into position upon such shoulder 60, the cam sleeve 56 then sliding upwardly to locate its cylindrical periphery 61 behind the latch balls, preventing them from moving inwardly off the latch shoulder 60. In this manner, the latch balls 53 hold the driven clutch member 33 disengaged from the driving clutch member 41.

It is to be noted that the latch shoulder 60 on the driven clutch member 33 is inclined in an inward and forward direction, and, because of this inclination, it tends to force the latch balls 53 inwardly of the driven spline member 27 to a released position, under the influence of a clutch reengaging spring 62 of helical form bearing upon the driven clutch member 33 and a shoulder or flange 63 on the inner end portion of the spindle 22. However, the spring 62 cannot allow the latch shoulder 60 to release the latch balls 53, since the latter are then in engagement with the cylindrical periphery 61 of the retainer sleeve 56.

In using the releasable torque transmitting device disclosed in Fig. 3, the spindle 22 is shifted inwardly of the casing 18, to engage the secondary clutch members 25, 26. The primary clutch members 39, 40 are also engaged; so that turning effort can be transmitted from the driving shaft 42, through the primary clutch 41, 33, spline connection 32, and secondary clutch 26, 25 to the spindle 22, socket head 24 and nut 10. When the nut has been tightened to a predetermined torque value, the longitudinal component of force between the driving and driven cam teeth 39, 40 overcomes the holding force of the air pressure on the valve head 47, shifting the latter from its seat 50 and allowing the air in the casing 18 to exhaust to atmosphere. The release of such holding force, due to the venting of the air under pressure through the passage 48, allows the driving cam teeth 40 to shift the driven cam teeth 39 and the driven clutch member 33 axially in a forward direction, until the latch shoulder 60 on the driven member is opposite the latch balls 53, whereupon the balls are projected outwardly into a position engaging such shoulder by the actuating spring 57 and retainer sleeve 56, the sleeve coming to rest with its cylindrical periphery 61 behind the balls 53. At this time, the secondary clutch 26, 25 is engaged, but no driving effort can be imparted to the spindle 22, since the primary clutch 41, 33 has been latched in disengaged position.

When it is desired to re-set the primary clutch, the spindle 22 is shifted in an outward direction by the clutch reengaging spring 62. During such outward or forward movement of the spindle, the flange 63 thereon engages an inturned flange 65 on the retainer sleeve 56, pulling the latter in a forward direction until its cylindrical periphery 61 no longer engages the latch balls 53, whereupon the tapered latch shoulder 60 on the driven clutch member 33 can force the balls radially inward to ineffective position under the influence of the clutch reengaging spring 62, which latter element then reengages the primary clutch teeth 39, 40 and the valve head 47 with its seat 50, in order that the apparatus is again in condition to again transmit torque or turning effort to the spindle 22, provided the spindle is moved rearwardly to reengage the secondary clutch teeth 25, 26.

The apparatus just described and disclosed specifically in Fig. 3 is mounted in the standards or supports 15 (see Fig. 1). Each apparatus 14 may have its individual electric motor 66, or other suitable prime mover, secured to it for rotating the drive shaft 42. The apparatus is also axially movable to at least a slight extent in these standards 15, to insure proper reception of each nut 10 within the wrench head or socket 24 disposed on the non-circular end 23 of the spindle 22. Such yieldable or slidable movement is obtained by providing a spring seat or flange 67 on the exterior of each casing 18 and having a spring 68 encircling the casing with one end engaging the seat 67 and the other end engaging a rear standard 15. It is evident that with this arrangement, an entire unit or device 14 can shift rearwardly in the event that the end of the wrench head 24 engages an end face of the nut 10, which enables the wrench head 24 to rotate or shift angularly relative to the nut to a sufficient degree, whereupon the spring 68 will force the head over the nut to its proper coupling position.

The slide member 16 and plurality of releasable torque transmitting devices 14 are movable to and from the nuts 10 and the work W by a fluid device. As disclosed in Fig. 1, this device includes an advancing cylinder 69 suitably secured to the stationary frame 17 and containing an advancing piston 70 having a piston rod 71 secured thereto and attached to the slide member 16. When air under pressure enters the head end of the cylinder 69, the piston 70 is urged to the right, as seen in Fig. 1, to advance the slide member 16 and the torque transmitting devices 14 toward the nuts 10. When the air pressure is released from the cylinder 69, a retracting spring 72 will return the slide member 16 and torque transmitting devices 14 from the work W, this spring bearing against the rod end of the piston 70 and also against the rod end of the cylinder 69. The slide member 16 is also retractable by a return piston 73 disposed within a return cylinder 74 suitably secured to the frame 17 and having a rod 75 secured to the piston for engagement with the slide member 16.

Current for simultaneously rotating all of the electric motors 66 is obtained from suitable power lines 76, 77 that are connected to each motor 66 by suitable conductive leads 78, 79. The air entering the casing 18 of each releasable torque transmitting device 14 flows into the inlet pipes or lines 49 communicating with each casing from a suitable main line or header 80. The pressure of this air depends upon whether or not the header line is communicable with a low pressure accumulator 81 or with a high pressure accumulator 82. Air under pressure flows from a suitable source into a main line 83, from where it can pass through a suitable low pressure regulator valve 84 and into the low pressure accumulator 81. From the latter, the air can flow through a low pressure line 85 leading to the inlet end of a low pressure control valve 86 whose outlet end is connected to an outlet line 87 running to a check valve 88 that prevents return flow of air to the outlet line 87. From the check valve 88, the air passes through a line or conduit 89 connected to the header line 80.

In a similar fashion, air from the main line 83 can pass through a high pressure regulator valve 90 into the high pressure accumulator 82, from where it flows through a high pressure line 91 to the inlet of a high pressure control valve 92. When this valve is open, the air flows from its outlet to a high pressure line 93 leading to a check valve 94, that prevents return flow of air into the high pressure line 93. From the check valve, the air passes through another line or conduit 95 connected to the header line 89 leading to the releasable torque transmitting devices 14.

The air under pressure for actuating the advancing piston 70 in the advancing cylinder 69 is also derived from the main pressure line 83. Thus, a suitable air conduit 96 extends from the main line 83 to the inlet side of a control valve 97, which, when open, allows the air to flow from the valve outlet into a conduit 98 running to the head end of the advancing cylinder 69. In a similar fashion, air can be fed to the head end of the return cylinder 74, passing from the main line 83 through a conduit 99 leading to the inlet of a return cylinder valve 100. When this valve is open, air will pass from its outlet to a conduit 101 running to the head end of the return cylinder 74.

At a particular stage in the cycle of operation of the apparatus, as explained hereinafter, it is desired to exhaust the header line 80 leading to the releasable torque transmitting devices 14. Such exhaust can occur by connecting the header line 89 through a conduit 102 to the inlet of a control valve 103 which, when open, will allow the air in the header line to flow through its outlet to atmosphere, thereby relieving all of the torque transmitting devices 14 of air under pressure.

The various control valves 97, 103, 86, 92, 100 illustrated may take any suitable form. It is preferred that they be of the type which will either be closed, to prevent the passage of a fluent medium, such as air, or open, to permit such passage. It is also preferred that when closed, the outlet of the valve will be open to atmosphere; so as to automatically bleed the air pressure from the outlet and the particular line connected thereto.

One form of valve that may be used, and which lends itself to actuation by cams, is disclosed in Fig. 16. This valve includes a body 104 having an inlet 105 and an outlet 106. An annular seat 107 is formed in the body between the inlet and the outlet, and this seat is engageable by a valve head 108 of disc-like form, which is urged into engagement with the seat 107 by a helical spring 109 bearing upon the underside of the head and upon the valve body 104. Secured to and extending from the head is a valve stem 110 slidable in the valve body. This stem is shifted downwardly (as disclosed in Fig. 16), to remove the head 108 from its companion seat 107, by a plunger 111 extending upwardly out of the body 104, the plunger having a lower head 112 engaging the upper end of the stem 110. When the head 108 is thus shifted to open position against the force exerted by the valve spring 109, an atmospheric exhaust port 113 in the upper end of the body is closed by the plunger head 112. When the plunger 111 is released, the valve head 108 is engaged with its seat 107 by the spring 109. At the same time, the plunger head 112 is elevated above the exhaust port 113 and a passage 114 in the stem 110 is placed in communication with the exhaust port 113, allowing the air under pressure in the outlet 106 to bleed through the stem passage 114 and out through the exhaust port 113.

The operation of the various control valves is determined by a timer motor 115 which drives a cam shaft 116 through the agency of a suitable reduction gearing 117 and at the proper speed. This cam shaft 116 is rotatably supported in suitable bearing supporting members 118 and has a cam $a$, $b$, $c$, $d$, $e$ affixed thereto for each of the valve control devices 97, 103, 86, 92, 100. The cams may be of the radial type their peripheries being engageable with the respective valve plungers 111. Another cam $f$ is attached to the cam shaft 116 for operating a disconnect switch 119, which has the purpose of effecting opening of the circuit to the timer motor 115.

Current to the timer motor is derived from a suitable source 120, passing through one conductor 121 to the timer motor 115 and through another conductor 122 to the central portion of a rotary ratchet switch 123 having circumferentially spaced contacts 124 thereon engageable by a suitable conductive arm 125 connected by a lead 126 to the other terminal of the power source 120. When the arm 125 engages one of the rotary contacts 124, the circuit through the timer motor 115 is completed, and, when disengaged therefrom, the circuit is broken.

The completion of the circuit to the timer motor 115 is instituted by the work W and the conveyor 11, when the work reaches a position in which its nuts 10 are in alignment with the spindles 22 and socket heads 24 on the releasable torque transmitting devices 14. When the work W arrives at this position, it closes a starting switch 127 connected in series with the source of power 120 and a solenoid coil 128. A lead 129 runs from one terminal of the source of power 120 to the starting switch 127, another lead 130 running from the starting switch to the solenoid coil 128, from which a lead 131 extends back to the other terminal of the source of power 120. When the starting switch 127 closes the circuit to the solenoid 128, the flexible, leaf spring-like solenoid plunger 132 is moved outwardly into engagement with one of the ratchet teeth 133 on the rotary switch 123, to rotate the ratchet switch 123 to a position in which one of its contacts 124 engages the switch arm 125, completing the circuit to the timer motor 115. The starting switch 127 may remain closed until the work W is removed from engagement with it. When this occurs, the switch 127 is opened and the solenoid plunger 132 retracted by a suitable spring (not shown).

The circuit to the timer motor is disrupted by the disconnect switch 119, which may be of the same type as the starting switch 127. The disconnect switch is connected through a suitable line 134 with one terminal of the power source 120, another line 135 running from the disconnect switch to another solenoid 136 that has a line 137 extending from it and connected to the other terminal of the source of power 120. When the disconnect switch 119 is closed momentarily by its cam $f$, its solenoid 136 is energized, shifting the flexible, leaf spring-like solenoid plunger 138 outwardly into engagement with the ratchet teeth 133, advancing the ratchet wheel 123 angularly to an extent that moves the contact 124 from engagement with the arm 125, thereby breaking the circuit to the timer motor 115 and allowing the latter to come to rest. After being energized, a spring (not shown) can return the solenoid plunger 138 to its initial position.

During actuation of the rotary switch ratchet wheel 123 by the plunger 138, the peripheral teeth of the ratchet wheel will deflect the leaf spring plunger 132 out of their way in order that the latter will not interfere with the operation of the switch in breaking the circuit to the timer motor 115, despite continued energization of the solenoid 128.

As specifically disclosed, the rotary ratchet switch 123 has six contacts 124 and twelve teeth 133. Each solenoid plunger 132, 138 has sufficient movement to rotate the switch 123 one-twelfth of a revolution, the switch closing plunger 132 advancing the ratchet one-twelfth of a revolution, to place a contact 124 in engagement with the switch arm 125 and the disconnect plunger 138 rotating the ratchet one-twelfth of a revolution; so that the arm 125 is located between conductive contacts 124, at which time no current can flow to the timer motor 115.

In the operation of the system disclosed in Fig. 1, the work W is illustrated as having just been conveyed to a position placing the nuts 10 in axial alignment with the releasable torque transmitting devices 14. The work W closes the starting switch 127, which has caused the solenoid plunger 132 to advance the rotary switch 123 to place its contact 124 in engagement with the switch arm 125, completing the circuit to the timer motor 115. The timer motor begins rotating, to rotate the cam shaft 116 and the cams mounted thereon. Of course, at this time the circuits to all of the electric motors 66 rotating the torque transmitting devices 14 have been completed, each torque transmitting device having its parts occupying the relative positions disclosed in Fig. 3, with the primary clutch 41, 33 engaged and the secondary clutch 25, 26 disengaged.

With the circuit to the timer motor completed, the cam shaft 116 is rotated, the low pressure cam $c$ depressing the plunger 111 of the low pressure control valve 86, opening the latter and allowing air under relatively low pressure to pass through the outlet line 87 and check valve 88 to the header line 80, to place all of the torque transmitting devices 14 under pressure, holding their valve heads 47 in engagement with their respective seats 50, and thereby providing the required force resisting separation of the primary clutch teeth 39, 40. At substantially the same time, or slightly thereafter, the advancing cam "$a$" depresses the plunger 111 of the advancing valve 97, opening the latter and allowing air to flow through the line 98 to the advancing cylinder 69. Such air under pressure shifts the piston 70 and slide member 16 toward the right (as seen in Fig. 1) to engage the wrench socket heads 24 with the nuts 10, and to shift all of the spindles 22 inwardly to a position in which the secondary clutches 25, 26 are engaged. If any of the socket heads 24 do not fit properly over a nut 10, the entire device 14 of which it forms a part may shift rearwardly of the standards 15 against the force of the spring 63 until the spindle 22 has moved arcuately to the extent in which the spring 60 can reshift the device 14 and its associated head 24 properly onto the nut 10.

The spindles 22 are all now being rotated, to rotate the nuts 10 on the studs 12, until the nuts engage the work W. As each nut 10 is tightened to the predetermined torque value, as determined by the relatively low pressure air in each device 14, the primary clutch 41, 33 for that particular nut is disengaged to disrupt the turning effort to the spindle 22 and nut, the primary clutch being held out of engagement by the latch devices 32, 53, 60 previously described. The low pressure cam $c$ keeps the low pressure valve 86 open a sufficient time to insure that all of the nuts 10 have been run up on their respective studs 12, and have been subjected to the predetermined torque, as a result of which the primary clutches of the devices 14 are released.

The low pressure cam $c$ then rotates to an extent in which it no longer bears upon the plunger 111, allowing the valve spring 109 to close the low pressure valve 86. The return cam $e$ then comes into play, to depress the plunger 111 of the return cylinder valve 100, which opens the latter and allows air to flow through the line 101 into the return cylinder 74, overpowering the air pressure in the advancing cylinder 69, and shifting its piston 70 to the left. Such shifting action need only be sufficient to move the slide member 16 and all of the releasable torque transmitting devices 14 to the left the distance necessary to disconnect all of the secondary clutches 25, 26, whereupon the latches 32, 53, 60 are released from holding the driven members 33 of the primary clutches disengaged, allowing the springs 62 to reengage the primary clutches 41, 33, and also reengage the valve heads 47 with their respective seats 50. The return cam $e$ continues to rotate with the cam shaft 116 until it rides off the valve plunger 111, allowing the valve spring 109 to close the return cylinder valve 100 and permit the air in the line 101 leading to the return cylinder 74 to exhaust to atmosphere.

As the cam shaft and cams continue to rotate, the high pressure cam $d$ then depresses the plunger 111 of the high pressure control valve 92, opening the latter and allowing air under pressure to flow through the line 93 and check valve 94 to the header line 80, placing air under a higher pressure in each casing 18 of the torque transmitting devices 14, to hold the valve heads 47 against their respective seats 50 with a greater holding force. Following bleeding of the return cylinder line 101 to atmosphere, the air under pressure to the advancing cylinder 69 then becomes effective to again shift the advancing piston 70 and slide member 16 to the right, to reengage all of the secondary clutches 25, 26 and allow the electric motors 66, operating through the releasable torque transmitting devices 14, to again act upon the nuts 10. Each nut will then be tightened to a higher torque value, and, when this torque value is reached, which is dependent upon the higher air pressure in each casing 18, the primary clutch 41, 33 will be released and latched in released position. The timer motor 115 continues to rotate the cam shaft 116 and the cams, the high pressure cam d maintaining the plunger 111 depressed for a sufficient time to insure that all of the torque transmititng devices 14 have tightened the nuts 10 to the required higher torque value, the primary clutches all being released and latched in their released position. The advancing cam "a" then rides off the plunger 111 of its companion valve 97, allowing the latter to close and allowing the line 98 from the advancing cylinder 69 to bleed through the valve 97 to atmosphere, whereupon the retracting spring 72 can shift the piston 70, rod 71 and slide member 16 to the left, to completely remove the sockets 24 from the nuts 10 and out of the path of the threaded studs 12.

As the cam shaft 116 continues to rotate, the exhaust cam b engages its plunger 111 to open the valve 103, bleeding the header line 80 to atmosphere and relieving the torque transmitting devices 14 of all air under pressure. During the time that this is happening, the disconnect cam f will momentarily close the disconnect switch 119, completing the circuit through the disconnect solenoid 136 and causing its plunger 138 to rotate the ratchet switch 123 to a position disrupting contact with the switch arm 125, and breaking the circuit to the timer motor 115, which will now come to rest.

The above sequence of events is illustrated graphically in Fig. 2, which indicates the rotation of the cams and cam shaft in a clockwise direction through one revolution, as shown by the arrow 140, starting from the lower reference arrow 141. The shaded areas in Fig. 2 represent the portion of the revolution of the cams that their associated valves and switch are operated. After the starting switch 127 has closed, to cause the starting solenoid plunger 132 to rotate the rotary switch 123 and complete the circuit to the timer motor 115, the latter begins rotating the cam shaft 116 and the radial cams. The first cam to come into play is the low pressure cam c, which opens the low pressure control valve 86 and pressures each releasable torque transmitting device 14. The next cam to come into play is the advancing cam "a" that opens its companion valve 97, allowing air under pressure to flow into the advancing cylinder 69. The advancing valve 97 remains open during almost the complete cycle of operation of the apparatus, as indicated by the shaded area in Fig. 2. The torque transmitting devices 14 are shifted onto the nuts 10, the low pressure cam c keeping the valve 86 open a sufficient length of time to insure tightening of all of the nuts 10 to the predetermined low torque value, at which time all of the primary clutches are latched in disconnected position. The low pressure cam c can then ride off the plunger of the valve 86, to allow the low pressure valve 86 to close.

As seen in Fig. 2, the next cam to come into operation is the return cam e that opens the return cylinder valve 100, causing air to flow to the return cylinder 74, pushing its piston 73 to the left, which moves the slide member 16 to the left. The extent of motion of the slide member 16 to the left need only be sufficient to effect disengagement of all of the secondary clutches 25, 26, and need not be so extensive as to remove the socket heads 24 from the nuts 10. Such disengagement of the secondary clutches releases the latches 53 from holding the driven members 33 of the primary clutches disengaged, allowing the return springs 62 to reengage all of those clutches. Thereafter, the high pressure cam d becomes effective to open the high pressure control valve 92, repressuring all of the releasable torque transmitting device 14 with a higher air pressure, the low pressure check valve 88 preventing this air from entering the low pressure control valve 86. Thereafter, the return cam e rides off its plunger 111, to allow the return cylinder valve 100 to close, which bleeds the air in the return cylinder 74 to atmosphere and allows the piston 70 in the advancing cylinder 69 to again shift the slide member 16 to the right, reengaging all of the secondary clutches 25, 26 and causing the individual electric motors 66 to again impose torque, through the releasable torque transmitting devices 14, on the nuts 10. The nuts will each be tightened to the predetermined higher torque, the high pressure cam d holding the high pressure control valve 92 open for a sufficient time to insure that all of the nuts 10 have been tightened to the higher torque value, and that all of the primary clutches 41, 33 have been disengaged and latched in disengaged position. The high pressure cam d then rides off its companion valve plunger 111, allowing the high pressure control valve 92 to close.

As the timer motor 115 continues to rotate, the advancing cam "a" will ride off its plunger 111, allowing the advancing valve 97 to close, bleeding the air in the advancing cylinder 69 to atmosphere and allowing the retracting spring 72 to shift the slide member 16 to the left and to its initial position. Thereafter, the exhaust cam b will engage its plunger 111, to open the exhaust valve 103 and bleed the header line 80 to atmosphere, relieving it of all pressure. While this is occurring, the disconnect cam f will close the disconnect switch 119 to complete the circuit to the disconnect solenoid 136, which will rotate the switch 123 to a position breaking the circuit to the timer motor 115.

It is apparent that the threaded fastening elements, such as the nuts 10, have been tightened in a plurality of stages. The nuts have first been tightened by substantially simultaneously rotating them to a predetermined torque value, which is lower than the final torque value desired. The torque transmitting devices 14 are automatically released when this lower torque value is reached, the devices being reset, subjected to a higher torque releasing force and then reapplied to the nuts 10 to tighten them to a final higher torque. Inasmuch as each nut has been tightened to a preliminary torque value, greater assurance is had that all of the nuts will be tightened to the higher and final torque value when the turning effort is reapplied to them, since it is only necessary to turn each nut a comparatively small fraction of a revolution to tighten them to the higher torque value. Such tightening action will occur on all of the nuts substantially simultaneously, assuring that each nut carries its proper share of the holding load.

If desired, the high pressure regulating valve 90 can be adjusted to provide the same pressure in the accumulator 82 as the low pressure regulating valve 84 provides in accumulator 81. When this occurs, the nuts will be tightened to the same torque two different times, but since they have all been tightened to a particular torque during the first stage of operation of the apparatus, any nut or nuts, which have been relieved of their share of the load after release of the torque transmitting device or devices applied thereto, will again be brought back to the desired degree of tightness when substantially the same torque is again reapplied to them.

In general, the system illustrated in Figs. 5 and 6 is essentially the same as the system shown in Fig. 1, except that it utilizes electromagnetic torque releasing devices 14a for tightening the threaded fastening elements 10 to the predetermined high and low torque values. The same timer motor and switch arrangement is employed as in the Fig. 1 device, and also air pressure is availed of for shifting the slide member 16 and the torque transmitting devices 14a carried thereby to and from operating engagement with the nuts 10, or other threaded fastening elements.

Each torque transmitting device 14a is mounted in the standards in exactly the same way as the devices 14 disclosed in Fig. 1. The devices themselves, however, are such as to hold the primary clutch teeth 39, 40 in engagement electromagnetically. As shown in Fig. 7, each releasable torque transmitting device 14a is essentially the same as the device illustrated in Fig. 3, except that electromagnetic instrumentalities are employed for holding the primary clutch engaged, rather than fluid or air instrumentalities. The drive shaft 42a has a driving clutch member drum or sleeve 41a secured to it, the forward end of which has the cam type of driving clutch teeth 40. These driving clutch teeth are engageable with the companion driven clutch teeth 39 on the driven clutch member 33a, which transmits its drive through the spline balls 35, driven member 27 and secondary clutch 26, 25 to the spindle 22, in the same manner as the device shown in Fig. 3. In addition, the latch and latch releasing elements 56, 53, 60, etc. are essentially the same as the device shown in Fig. 3.

The driven clutch member 33a is held with its teeth 39 in engagement with the driving clutch teeth 40 by an electromagnet arrangement. Thus, the driven clutch member 33a has a transverse wall 145 that forms the armature attractable by the pole piece 146 of an electromagnet having a coil 147 wound around the core 148 that terminates in the pole piece. The electromagnet is attached to the driving clutch 41a; so as to rotate therewith. Current to the electromagnet is supplied through a pair of longitudinally spaced collector rings 149, 150 mounted on an insulating sleeve 151 secured to the drive shaft 42a, there being leads 152, 153 running from the collector rings to the coil 147. When current is caused to pass through the coil, it exerts a magnetic attracting force on the armature portion 145 of the driven clutch member 33a, tending to hold the driven clutch member in engaged position with the driving clutch member 41a. When the torque transmitted between the cam clutch teeth 39, 40 exceeds a value corresponding to the holding force of the electromagnet, the armature 145 and the driven member 33a are shifted forwardly to break the holding force of the magnet and allowing the driven member to be shifted completely out of clutching relation to the driving member 41a, in which position the driven member 33a is held by the latch device 53, 56, etc. The holding force of the electromagnet 146—148 can be changed by changing the current flowing through the electromagnet coil 147, in order to increase or decrease the torque required to disengage the primary clutch 41a, 33a. In all other respects than those noted, the releasable torque transmitting device shown in Fig. 7 is the same, and functions the same, as the device illustrated in Fig. 3.

As disclosed in Fig. 5, the cam shaft 116 has the advance cam $a$, return cam $e$ and disconnect switch cam $f$ secured to it, which operate the advance cylinder valve 97, the return cylinder valve 100 and the disconnect switch 119, respectively. In addition, the cam shaft 116 has a low voltage cam $c^1$ attached to it, as well as a high voltage cam $d^1$. The low voltage cam $c^1$ bears upon a follower 155 secured to a switch arm 156 which is movable into engagement with a contact 157 that has a lead 158 running to a suitable low voltage source 159. The switch arm 156 is connected through a suitable lead 160 to brushes 161 bearing upon one of the collector rings 150 on each of the releasable torque transmitting devices 14a. Another line 162 runs from the low voltage source 159 to another lead 163 connected to brushes 164 bearing upon the other collector rings 149 of the releasable torque transmitting devices.

A high voltage cam $d^1$ is also attached to the cam shaft 116 for operating a switch arm 165 that is connected to the first-mentioned lead 160 running to the collector rings 150, the switch arm being movable by the cam $d^1$ into engagement with a contact 166 connected to a lead 167 running to a source of high voltage 168, this source being connected through another lead 169 to the conductor 163 running to the other collector rings 149.

In the operation of the system, illustrated in Fig. 5, the work W is moved by the conveyor 11 to a position in which its nuts 10 are in alignment with the spindles 22 of the electromagnet releasable torque transmitting devices 14a, at which point the starting switch 127 is closed; so that the starting solenoid plunger 132 rotates the switch 123 to a position closing the circuit through the timer motor 115. This motor begins rotating, to rotate the cam shaft 116 and the cams $a$, $c^1$, $d^1$, $e$, $f$. The low voltage cam $c^1$ moves its companion switch arm 156 into engagement with the contact 157 connecting all of the electromagnetic coils 147 in the torque transmitting devices with the low voltage source 159, holding each primary clutch 41a, 33a engaged by the attracting force imposed by the electromagnet 146—148 on the armature 145. The advance cam $a$ then opens its companion valve 97, causing the advance piston 70 to shift the slide 16 and the torque transmitting devices 14a towards the work W, the socket heads 24 becoming coupled to the nuts 10. The electric motors 66 then rotate the nuts 10 through the torque transmitting devices 14a until they are tightened against the work W to a predetermined torque value, at which point the driving cam teeth 40 will bear upon the driven cam teeth 39 on each device 14a to overcome the holding force of the electromagnet, shifting the driven clutch members 33a forwardly to a disengaged position, in which they are held by the latch device 53, 60, etc. The return cam $e$ then opens its companion valve 100, to allow air to enter the return cylinder 74, which moves its piston 73 to the left (as seen in Fig. 5) to shift the slide 16 and the torque transmitting devices 14a to the left sufficiently to disengage all of the secondary clutches 25, 26, which action releases all of the latches 53 and allows the springs 62 to reengage the primary clutches 41a, 33a.

The low voltage cam then is rotated sufficiently to allow its switch arm 156 to move away from engagement with the low voltage contact 157, whereupon the high voltage cam $d^1$ moves its switch arm 165 into engagement with the high voltage contact 166, which imposes a higher voltage upon all of the electromagnetic coils 147, which then hold their respective armatures 145 and primary clutch elements 39, 40 in driving engagement. The return cam $e$ is then rotated to a position allowing its companion valve 100 to close, which bleeds the line 101 leading to the return cylinder 74 to atmosphere, allowing the air under pressure in the advancing cylinder 69 to reshift its piston 70 and the slide member 16 to the right, to reengage the secondary clutches 25, 26 and cause all of the nuts 10 to again be subjected to torque. Since each electromagnetic coil 147 now has a greater voltage and current imposed upon it, it will hold the armature 145 with a greater force, requiring a correspondingly greater torque to be imposed upon each nut before the cam teeth 39, 40 of the primary clutch can exert sufficient force to shift each armature 145 away from its companion magnet, and disengage each primary clutch 31a, 33a.

The cam shaft 116 and cams continue rotating, the high voltage cam $d^1$ riding off the switch arm 165, allowing the latter to shift back to open position with respect to its contact 166, breaking the circuit to the electromagnetic coils 147. The advance cam "$a$" has then been rotated to a position allowing its valve 97 to close, which bleeds the air in the advancing cylinder 69 to atmosphere and allows the return spring 72 to shift the slide member 16 and all of the torque transmitting devices 14a to their initial positions, entirely out of engagement with the nuts 10 and out of the path of travel of the work W on the conveyor 11. After this occurs, the disconnect cam $f$ will close the disconnect switch 119, to complete the circuit to the solenoid 136, causing its plunger 138 to rotate the ratchet contact switch 123 to a position breaking the circuit to the timer motor 115.

Here again, as in the apparatus disclosed in Fig. 1, the high voltage source 168 may, if desired, be varied to any degree relative to the low voltage source 159, and it may, for that matter, be caused to provide the same voltage as the low voltage source; so as to subject the threaded fastening elements 10 twice to the same torque value, which will insure retightening of any threaded fastening element that may have been deprived of some of its holding force, during the initial tightening stage, by the later tightening of one of the other fastening elements.

Fig. 6 is a timing diagram of the sequence of events just described in connection with Fig. 5. The cams are rotated in the direction of the arrow 140a, and, starting from the position indicated by arrow 141a, the shaded area for each cam indicates the relative period in the cycle of operation that it is effective to operate its associated valve or switch.

In the apparatus disclosed in Fig. 8, releasable torque transmitting devices 14b of the type shown in Figs. 10 to 15, inclusive, may be used. Each device includes an outer casing 170 having a drive shaft 171 rotatable in an end closure 172, and a spindle 22a rotatable in the opposite end of the casing. The drive shaft 171 is suitably coupled to a prime mover, such as an electric motor 66, whereas the driven spindle 22a also has the non-circular end 23 extending outwardly of the casing, on which a wrench socket 24 may be mounted for coupling engagement with a threaded fastening element, such as the nut 10.

The drive shaft 171 has a driving clutch member 173, in the form of a drum or housing, secured to it which is provided with inwardly projecting drive teeth 174, each of which is engageable with the power arm portion 175 of a clutch pawl 176, in the form of a bell crank lever pivotally mounted upon a fulcrum pin 177 secured to a driven clutch member 178 integral with, or secured to, a driven shaft 179, in the form of a torsion member or tube extending forwardly of the device toward the spindle 22a. The forward end of the torsion member 179 has driving clutch teeth 180 engageable with driven clutch teeth 181 secured to the spindle 22a, to provide a secondary clutch, corresponding to the secondary clutch of the devices illustrated in Figs. 3 and 7.

The coengaging faces on the drive teeth 174 and the clutch pawls 176 (see Fig. 14) are such that the force transmitted between the two tends to swing the power arms 175 inwardly and out of engagement with the drive teeth 174. Such disengagement is prevented in a positive manner by a holding or locking device, in the form of a disc or ring 182 disposed coaxially of the drive shaft 171 and engaging the holding arm portion 183 of each clutch pawl, which extends inwardly from the fulcrum pin 177. It is evident from Figs. 10 and 14 that the lock disc 182 holds the arms 183 in an outward position, to maintain the power arms 175 in full engagement with the clutch teeth 174 on the drive member. The lock disc 182 is urged in this direction by a reset spring 184 disposed within a bore 185 in the drive shaft 171 and bearing upon the end of a lock shaft 186 integral with the disc 182 and piloted within the bore.

The primary clutch elements 174, 176 will remain engaged so long as the lock disc 182 is positioned behind the holding arms 183 of the clutch pawls. Disengagement of the lock disc occurs whenever a predetermined torque, for which the device is adjusted or set, is transmitted through the torsion tube 179. As the torque transmitted through the tube increases, it is twisted; so as to eventually complete a circuit through an electromagnet 187 slidably disposed around the torsion tube 179. When the circuit is completed, the electromagnet 187 is attracted toward the driven clutch member disc 178, pushing upon a plurality of release pins 188 secured to and extending longitudinally from the lock disc 182 through holes 189 in the driven clutch member. The magnetic attraction of the electromagnet 187 by the driven clutch member 178 pushes the pins 188 and lock disc 182 rearwardly against the force of the reset spring 184 sufficiently to dispose the lock disc 182 out of engagement with the inner shoulders 190 of the holding arms 183. When such disengagement occurs, the drive teeth 174 can immediately swing the power arms 175 inwardly and out of engagement therewith, to disrupt the drive to the secondary clutch 180, 181.

The circuit to the electromagnet 187, as stated above, is controlled by the amount of twist imparted to the relatively elongate torsion member or tube member 179. The driven clutch member 178 has a bar 191 extending longitudinally therefrom, on which a plurality of terminals 192, 193 are mounted. Each terminal is threaded into the bar and has a lock nut 194 thereon for securing the terminal in adjusted position. The terminals 192, 193 each have a contact 195 or 196 adapted to be engaged by companion contacts 197, 198 of a plurality of terminals 199, 200 carried on a bar 201 fixed to an outer drum member 202 surrounding the torsion tube 179 and secured to the latter at its forward portion, as by means of a plurality of pins 203.

The outer drum 202 transmits substantially no torque, whereas all of the torque or load is being transmitted through the elongate tube 179. As a result, there is a twist, or angular movement, between the rearward portion of the torque tube 179 with respect to its forward portion; so as to move the driven clutch member 178 angularly with respect to the outer drum 202, shifting the clutch member contacts 195, 196 toward the drum member contact 197, 198. When sufficient torque is transmitted through the torsion tube 179, a selected pair of contacts 195, 197 or 196, 198 will engage to complete the circuit through the electromagnet 187 and effect removal of the locking disc 182 from behind the pawl arms 183, causing immediate disengagement of the primary clutch 174, 176.

As disclosed in the drawings, two pairs of contacts 195, 197 and 196, 198 are provided to effect release of the primary clutch at two different torque values. With no load being transmitted, one set of contacts 195, 197 is spaced closer together than the other set of contacts 196, 198; so that the first set of contacts 195, 197 will engage at a lower torque value transmitted through the torsion tube 179 than the other set of contacts 196, 198. The terminals 199, 200 are slidably mounted in the drum bar 201, being urged toward the other terminals 192, 193 by the springs 204, the extent of such movement being limited by transverse pins 205 passing through the terminals and engaging the bar 201.

The circuit through the electromagnet coil 187 may be completed when any selected set of contacts 195, 197 or 196, 198 engage. Current is derived from a suitable power source 206, such as a battery or generator, one pole of the source being connected through a conductive lead 207 to a brush 208 engaging a slip ring 209 electrically connected to one of the clutch member contacts 196. The source of power 206 is also connected through a suitable lead 210 to a switch arm 211 that is movable into and out of engagement with a contact 212 connected to another brush 213 by means of a suitable lead 214, the brush engaging another collector ring 215 having a lead 216 running to the other terminal 195 carried by the driven clutch member 178. The other pole of the power source 206 is connected to a third brush 217 bearing on a third collector ring 218 connected through a lead 219 to one end of the electromagnet coil 187, the other end of the coil being connected through suitable leads 220, 221 to the terminals 199, 200 carried by the outer drum 202.

When the selector switch 211, 212 is closed, the pair of contacts 195, 197 spaced closer to one another is made effective; so that when sufficient torque has been transmitted through the torsion tube 179 to twist it to the desired angular extent, the contacts 195, 197 are engaged and the electromagnet coil energized, the latter being attracted and shifted toward the driven clutch member disc 178, to release the lock member 182 from the holding arms 183, enabling the driving clutch teeth 174 to force the clutch pawls 176 out of engagement therewith. If the selector switch 211, 212 is opened, engagement between the pair of contacts 195, 197 just referred to can have no effect on the electromagnet coil 187. Accordingly, a greater torque must be transmitted through the torsion tube 179, to twist it to a greater angular extent before the other pair of contacts 196, 198 are brought into engagement, which will complete the circuit through the electromagnet coil 187 and cause it to move the lock disc 182 from behind the holding arms 183. Of course, when the first pair of contacts 195, 197 engage, they do not interfere with continued movement of the other pair of contacts 196, 198 toward one another, since the drum terminal 199 can move within its supporting bar 201 against the action of the helical spring 204.

Following release of the clutch pawls 176 from the driving teeth 174, they are latched in such releasing position by a mechanism now to be described. During the transmission of torque through the device, the spindle 22a has been moved inwardly, or rearwardly, to engage the secondary clutch teeth 180, 181, such engaging action being maintained against the clutch releasing force of a compression spring 222 disposed between the inner face of the spindle 22a and the forward face of the torsion tube 179. A rod 223 is secured to and coaxially of the spindle 22a, extending longitudinally through the central bore 224 of the tube 179 to the region of the driven clutch member disc 178. This rod has a spring seat 225 attached to it, against which one end of a latch actuating spring 226 bears, the other end bearing against a latch sleeve 227 slidable on the rod 223 and disposed within a recess or counterbore 228 in the rearward portion of the torsion tube 179. This latch sleeve has an inwardly directed flange 229 engageable by a head 230 at the rear end of the rod 223, for the purpose of effecting resetting of the mechanism, in the manner described hereinafter.

When the lock disc 182 is disposed behind the shoulder portions 190 of the holding arms 183, the rear end of the latch sleeve 227 bears upon the transverse faces of the holding arms 183, the latch sleeve 227 being disposed within the counterbore 228, and such bearing engagement preventing the actuating spring 226 from shifting the latch sleeve to its latched position. When the lock disc 182 is shifted rearwardly by the electromagnet 187, out of engagement with the clutch pawls 176, the drive teeth 174 shift the power arm portions 175 of the clutch pawls inwardly, the momentum swinging the holding arms 183 across the end face of the latch sleeve 227 and out of engagement with the latter. When this occurs, the actuating spring 226 is effective to shift the latch sleeve 227 rearwardly to a position in engagement with the transverse rearward surfaces 231 of the holding arms 183, as illustrated in Fig. 15, securing the holding arms 183 in the position to which they have been swung by the driving teeth 174, which maintains the power arm portions 175 of the clutch pawls 176 completely out of the path of movement of the drive teeth 174.

The latch sleeve 227 cannot be released until the secondary clutch 180, 181 has been disengaged. When the endwise force on the spindle 22a is released, the spring 222 shifts the spindle in a forward direction, to disengage the secondary clutch teeth 180, 181 from one another. Such forward movement also moves the rod 223 with the spindle, causing the rod head 230 to engage the sleeve flange 229, pulling the latter in a forward direction back into the counterbore 228 in the torque tube 179 and out of engagement with the transverse surfaces 231 of the holding arms 183, as illustrated in Fig. 13. As soon as the sleeve 227 is removed from the holding arms 183, a tension reset spring 232, secured to one end of each holding arm 183 and at its other end to the driven clutch member 178, is effective to swing each holding arm back to its initial position, to reposition the power arm 175 outwardly to the point where they can be reengaged by the drive teeth 174. Upon the swinging of the holding arms 183 to their initial position, the reset spring 184 is effective to shift the lock disc 182 in a forward direction and back behind the holding arm shoulders 190, maintaining the power arms 175 locked in driving engagement with the drive teeth 174. Of course, the resetting operation just described will only occur upon disruption of the circuit to the electromagnet 187.

The wrench socket 24 may now be reapplied to the work, to push the spindle 22a rearwardly and reengage the secondary clutch 180, 181, whereupon the releasable torque transmitting device 14b is again effective to tighten a threaded fastening element 10 to the predetermined torque value at which the contacts 195-198 have been adjusted, and in accordance with the particular set of contacts that has been selected to be effective.

As disclosed in Fig. 8, a plurality of the devices 14b just described may be mounted in the standards 15 of the slide member 16 in essentially the same manner as described in the apparatus illustrated in Figs. 1 and 5. The slide member 16 is advanced and retracted by the same cylinder mechanism 69, 74, and by the same cam operated valves 97, 100, as in the other forms of the invention. In addition, the timer motor 115, and the starting and stopping switch control mechanism 119—138 therefor, is the same as in the other forms of the invention. The pair of contacts 195, 197 or 196, 198 to be effective in all of the releasable torque transmitting devices 14b is selected by a cam $c^{11}$, mounted on the timer cam shaft 116, by the movement of a switch arm 211, which corresponds to the switch arm illustrated in Fig. 11, but which controls the passage of current to all of the sets of closer spaced contacts 195, 197 in all of the torque transmitting devices 14b. Thus, the arm 211 is connected through a suitable lead 240 to all of the brushes 213 engaging the collector rings 215 running to the contacts 195 carried by the driven clutch member supporting bars 191. The other contacts 196 on the driven clutch member supporting bars are connected to one pole of a source of power 241, through the collector rings 209, brushes 208 and lead 242. The other pole of the source of power 241 is connected through a suitable lead 243 to all of the brushes 217 engaging the collector rings 218 electrically connected to one end of the electromagnetic coils 187. The first-mentioned pole of the power source 241 is also connected through a suitable lead 244 with a contact 245 engageable by the cam operated switch arm 211.

It is apparent that when the cam $c^{11}$ shifts the switch arm 211 into engagement with its contact 245, the circuit to each electromagnet 187 can be completed when the closer spaced contacts 195, 197 engage one another, which will cause the torque transmitting devices 14b to release at a lower torque value. When the switch 211, 245 is open, the closer spaced contacts are ineffective; so that the further spaced contacts 196, 198 must be engaged through transmission of a higher torque, to effect release of each of the torque transmitting devices 14b.

The operation of the apparatus disclosed in Fig. 8 will now be described, reference also being made to the timing diagram shown in Fig. 9. The timer motor 115 is started by the starting switch 127 when the threaded fastening elements 10 on the work W are shifted into alignment with the torque transmitting devices 14b. As the cam shaft 116 rotates, it causes the cam $c^{11}$ to close the switch 211, 245 which makes the closer spaced contacts 195, 197 effective. The advancing cam "a" then opens its associated valve 97, to allow air to pass into the advancing cylinder 69, which causes the slide member 16 and releasable torque transmitting devices 14b to be shifted toward the work W, to place the wrench sockets 24 in coupling engagement with the nuts 10. The nuts are all run down on the threaded studs 12 against the work until the preselected lower torque is reached, at which time the circuit through each of the electromagnets 187 is completed by engagement of the contacts 195, 197, causing each electromagnet 187 to remove its companion lock disc 182 and disrupt the drive to the releasable torque transmitting devices 14b, the latch sleeve 227 then being projected behind the holding arms 183 to maintain the clutch pawls 176 out of driving engagement with the driving teeth 174.

After sufficient time has elapsed to insure that the primary clutches 174, 176 on all of the torque transmitting devices have been released, the cam $c^{11}$ rides off the switch arm 211, allowing the latter to shift back from the contact 245, rendering the closer spaced contacts 195, 197 ineffective to complete the circuit through each of the electromagnetic coils 187. The return or retracting cam $e$ then becomes effective to open its valve 100, allowing air under pressure to enter the return cylinder 74, which shifts the slide 16 away from the work to a sufficient extent to allow the springs 222 to disengage the secondary clutches 180, 181, and to cause the release heads 230 on the rods 223 to remove the latch sleeves 227 from their holding positions against the clutch pawls 176, which then enables the reset springs 232 to shift the clutch pawls back into engagement with the drive teeth 174 of the primary clutch.

As the cam shaft 116 continues to rotate, the return cam $e$ rides off the plunger of its associated valve 100, allowing the latter to close and bleeding the air in the return cylinder 74 to atmosphere, which then causes the piston 70 in the advancing cylinder 69 to again shift the slide member 16 and the torque transmitting devices 14b toward the work W, reengaging the secondary clutches 180, 181 and allowing the turning effort to again be imposed upon the nuts 10. A greater turning effort or torque must be imparted to the nuts before the primary clutches are individually released, since each torsion tube 179 must then be twisted to a greater extent to bring the other sets of contacts 196, 198 into engagement, for the purpose of completing the circuits through the electromagnet coils 187. When this occurs, each lock disc 182 is forced rearwardly out of engagement with the holding arms 183, allowing the driving teeth 174 to disconnect the clutch pawl arms 175, swinging the holding arms 183 across the latch sleeve 227 to a position in which the latter is again projected by the spring 226 into a position maintaining the clutch pawls 176 out of the path of the driving teeth 174.

As the cam shaft 116 continues to rotate, the advancing cam "a" rides off the plunger of the advancing valve 97, allowing the latter to close and the air in the advancing cylinder 69 to bleed to atmosphere, the retracting spring 72 then returning the slide member 16 and releasable torque transmitting devices 14b to their initial positions. Continued rotation of the cam shaft 16 causes the disconnect cam f to close the disconnect switch 119 and effect stopping of the timer motor 115, in the manner described in connection with the other forms of the invention.

As with the other embodiments of the invention, the releasable torque transmitting devices 14b may be used to apply the same torque twice to the threaded fastening elements 10. This can be done by having the sets of contacts 195, 197 and 196, 198 spaced the same distance from each other; so as to be engaged when the torsion tube 179 is subjected to the same torque. Another manner of subjecting the threaded fastening elements 10 twice to the same torque is to design the cam $c^{11}$ so that it holds the switch 211, 245 closed for a sufficient length of time to allow the torque transmitting devices to be reapplied to the nuts 10 and then released a second time.

Figure 18:
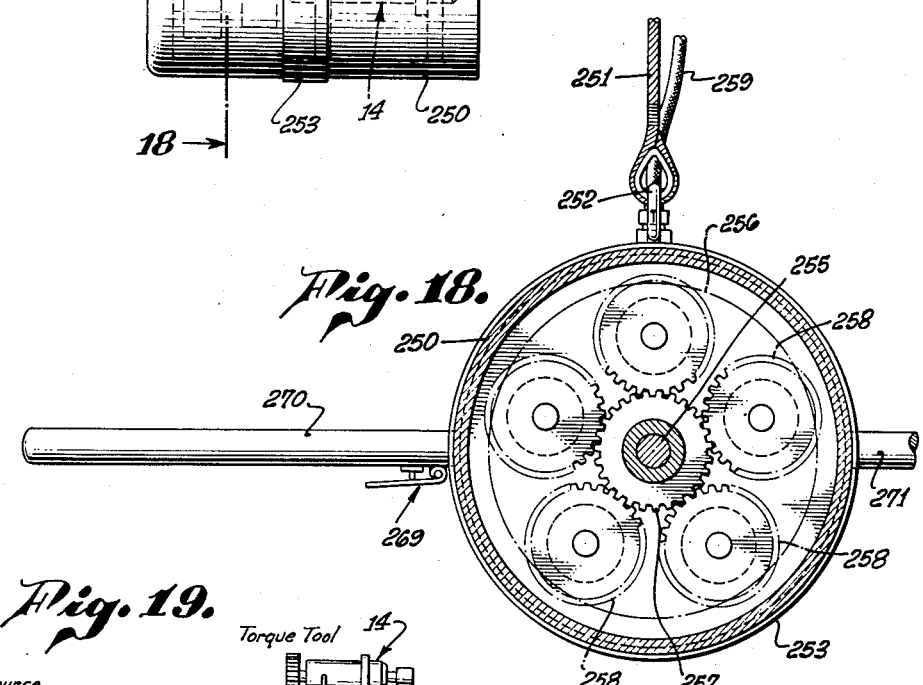
Fig. 18 is a cross-section taken along the line 18—18 on Fig. 17.
Figure 19:
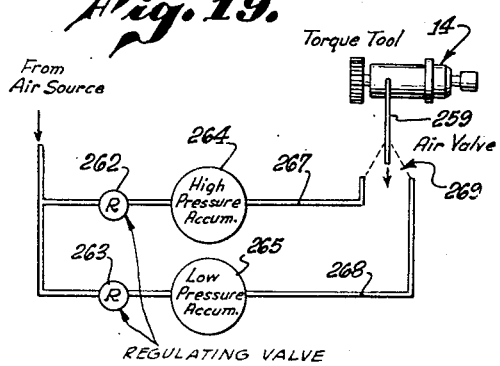
Fig. 19 is a diagrammatic view of the control system for operating the gang torque apparatus shown in Fig. 17.

A hand operated gang apparatus is disclosed in Figs. 17 to 19, inclusive, for tightening a plurality of threaded fastening elements in stages to the desired final torque values. This apparatus includes an outer housing or case 250 which may be supported from a suitable cable or line 251 attached to a bail 252 secured to a band or strap 253 encircling the housing.

A prime mover 254, such as an electric motor, is mounted coaxially in the housing 250, its drive shaft 255 having a flywheel 256 thereon, and being connected to a pinion 257 which meshes with a plurality of driven gears 258 secured to the drive shafts 42 of releasable torque transmitting devices 14 mounted in the housing. These devices 14 may be of the air controlled type illustrated in Fig. 3 and have their axes disposed concentrically about the axis of the motor 254 and pinion 257. Springs 68 may encircle the elongate casing 18 of each device, bearing upon its flange 67 to yieldably urge it toward the threaded fastening element in much the same fashion as illustrated in Fig. 1. Air enters the housing 250 through a suitable line 259 and can also enter the casing 18 of each of the torque transmitting devices through its inlet port 49a. A suitable seal 260, such as a rubber O ring, may be disposed between the forward end wall 261 of the housing and the periphery of each elongated casing 18, to prevent air leakage from the housing.

Air from a suitable source may flow through high and low pressure regulator valves 262, 263 into high and low pressure accumulators 264, 265, respectively, from where it passes through suitable lines 267, 268 into an air valve 269, shown diagrammatically in Fig. 19. The air valve 269 may be manipulated to establish communication between the inlet line 259 to the housing 250 and either the low pressure line 268 or high pressure line 267.

Initially, the air valve 269 is connected to the low pressure line 268; so that each torque transmitting device 14 is subjected to relatively low pressure and will release at a relatively low torque value. Arm holders 270, 271 are grasped by the operator and the sockets 24 on the ends of the spindles 22 applied to the nuts (not shown). The prime mover 254 rotates, transmitting its motion through the pinion 257 and gears 258 to the drive shafts 42 of each of the torque transmitting devices 14, causing the spindles 22 and sockets 24 to rotate, tightening the nuts to the desired lower torque value corresponding to the relatively low air pressure in each of the casings 18. Following such release, the entire device is shifted back sufficiently from the work to effect disconnection of all of the secondary clutches 25, 26 and resetting of the primary clutches 41, 33, whereupon the air valve 269 is manipulated to place the inlet line 259 to the housing 250 in communication with the high pressure line 267, the devices 14 again being moved toward the work by the operator, to reengage the secondary clutches 25, 26 and subject the nuts to additional torque. When the higher torque is imposed on each of the nuts, the primary clutches 41, 33 in each of the devices will automatically release and be latched in released position, the device functioning in exactly the same manner as was described in connection with the apparatus shown in Fig. 3. In this manner, the threaded fastening elements are retightened in two stages, to insure that they have all been subjected to the same final torque value and that they will each be carrying substantially equal portions of the holding load.

If desired, the threaded fastening elements may be subjected repeatedly to the same tightening torque. Thus, the operator can select either the high or low torque through suitable manipulation of the air valve 269, tightening the threaded fastening elements initially to the selected torque value, releasing the secondary clutches 25, 26 to effect resetting of the primary clutches 41, 33, and then reapplying the devices 14 and the turning effort to the threaded fastening element, the devices again releasing at the same torque value, with assurance that all of the nuts have been tightened to substantially the same extent.

The inventors claim:

1. In apparatus for simultaneously rotating a plurality of threaded fastening elements: driven means for each said elements; driving means for each of said driven means; means releasably and continuously coupling each of said driving means and driven means together for rotation together through more than one revolution until said coupling means is released when said driven means is subjected to a predetermined torque in tightening its associated threaded fastening element; means holding said coupling means in released position; and means for substantially simultaneously rendering said holding means ineffective and effecting recoupling of all of said coupling means, after they have been released, to reestablish the drive between all of said driving and driven means.

2. In apparatus for simultaneously rotating a plurality of threaded fastening elements: driven means for each of said elements; driving means for each of said driven means; means releasably and continuously coupling each of said driving means and driven means together for rotation together through more than one revolution until said coupling means is released when said driven means is subjected to a predetermined initial torque in tightening its associated threaded fastening element; means holding said coupling means in released position; means for substantially simultaneously rendering said holding means ineffective and effecting recoupling of said coupling means to reestablish the drive between all of said driving means and driven means; and means for then holding each of said coupling means engaged until said driven means is subjected to a predetermined torque higher than said initial torque.

3. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means holding said coengaging parts disengaged from each other; and means for releasing said holding means and effecting reengagement between said parts in all of said devices to reestablish the driving connection between all of the driving and driven members.

4. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means holding said coengaging parts disengaged from each other; means for shifting said devices longitudinally of their axes; and means responsive to shifting of said devices longitudinally of their axes to release said holding means and effect reengagement between the parts in all of said devices to reestablish the driving connection between all of the driving and driven members.

5. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means holding said coengaging parts disengaged from each other; means for releasing said holding means and effecting reengagement between said parts in all of said devices to reestablish the driving connection between all of the driving and driven members; and means for increasing the predetermined torque at which all of said torque responsive means can effect disengagement between said parts following reestablishment of the driving connection between all of the driving and driven members.

6. In apparatus for simultaneously rotating a plurality of threaded fastening elements: a releasable torque transmitting device for rotating each of said elements, each device including a driving member, a driven member, coengaging parts on said members for effecting a rotatable driving connection therebetween, means responsive to a predetermined torque imposed on said driven member for effecting disengagement between said parts to completely interrupt the drive between said driving and driven members; the parts of all devices being disengaged at substantially the same torque transmitted through the driven members; means holding said coengaging parts disengaged from each other; means responsive to shifting of said devices longitudinally of their axes to release said holding means and effect reengagement between the parts in all of said devices to reestablish the driving connection between all of the driving and driven members; and means for increasing the predetermined torque at which all of said torque responsive means can effect disengagement between said parts following reestablishment of the driving connection between all of the driving and driven members.

7. In apparatus for simultaneously rotating a plurality of threaded fastening elements: a releasable torque transmitting device for each of said elements and having disengageable means therein for disrupting the turning effort to said elements when the torque transmitted exceeds a predetermined value; means for holding said disengageable means in disengaged position; means for advancing all of said devices relatively toward said elements to rotate the elements and tighten them to a predetermined extent; means for then relatively shifting all of said devices in a direction away from said elements to release said holding means and effect reengagement of said disrupting means; and means for then relatively advancing said devices toward the elements to impart further turning effort to the elements to tighten the elements to a predetermined torque value.

8. In apparatus for simultaneously rotating a plurality of threaded fastening elements: a releasable torque transmitting device for each of said elements and having disengageable means therein for disrupting the turning effort to said elements when the torque transmitted exceeds a predetermined value; means for holding said disengageable means in disengaged position, means for advancing all of said devices relatively toward said elements to rotate the elements and tighten them to a predetermined extent; means for then relatively shifting all of said devices in a direction away from said elements to release said holding means and effect reengagement of said disrupting means; means for substantially simultaneously increasing the predetermined torque at which all of said disengageable means can disrupt the turning effort imparted to the elements; and means for then relatively advancing said devices toward the elements to impart further turning effort to the elements to tighten them to such predetermined higher torque value.

9. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means holding said coengaging parts disengaged from each other; means for releasing said holding means and effecting reengagement between said parts in all of said devices to establish the driving connection between all of the driving and driven members; and means common to all of said devices for substantially simultaneously varying the torque at which the parts of all of said devices are disengageable.

10. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means holding said coengaging parts disengaged from each other; means for shifting said devices longitudinally of their axes; means responsive to shifting of said devices longitudinally of their axes to release said holding means and effect reengagement between the parts in all of said devices to reestablish the driving connection between all of the driving and driven members; and means common to all of said devices for substantially simultaneously varying the torque at which the parts of all of said devices are disengageable.

11. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; fluid pressure responsive means for holding said parts engaged until said predetermined torque is imposed on said one of said members; and means for effecting reengagement between said parts in all of said devices to reestablish the driving connection between all of the driving and driven members.

12. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means for effecting reengagement between said parts in all of said devices to reestablish the driving connection between all of the driving and driven members; fluid pressure responsive means for holding the parts of each of said devices engaged until said predetermined torque is imposed on said one of said members; means for feeding fluid at a predetermined pressure simultaneously to all of said fluid pressure responsive means; and means for increasing the pressure of the fluid fed simultaneously to said fluid pressure responsive means to increase the predetermined torque at which all of said torque responsive devices can effect disengagement between said parts following reestablishment of the driving connection between all of the driving and driven members.

13. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; and magnetic means for holding said parts engaged until said predetermined torque is imposed on said one of said members.

14. In apparatus for simultaneously rotating a plurality of threaded fastening elements: a releasable torque transmitting device for rotating each of said elements, each device including a driving member, a driven member, coengaging parts on said members effecting a rotatable driving connection therebetween, means responsive to a predetermined torque imposed on one of said members for effecting disengagement between said parts to completely interrupt the drive between said driving and driven members; said parts of all devices being disengaged at substantially the same torque transmitted through said one of said members; means for effecting reengagement between said parts in all of said devices to reestablish the driving connection between all of the driving and driven members; electromagnetic means for holding the parts of each of said devices engaged until said predetermined torque is imposed on said one of said members; means for supplying a predetermined current simultaneously to all of said electromagnetic means; and means for simultaneously increasing the current supplied to said electromagnetic means to increase the predetermined torque at which all of said torque responsive devices can effect disengagement between said parts following reestablishment of the driving connection between all of the driving and driven members.

15. In apparatus for simultaneously rotating a plurality of threaded fastening elements: a releasable torque transmitting device for rotating each of said elements, each device including a driving member, a driven member, coengaging parts on said members effecting a rotatable driving connection therebetween, electromagnetic means for effecting disengagement between said parts to completely interrupt the drive between said driving and driven members; said parts being disengaged at substantially the same torque transmitted through said one of said members; means responsive to a predetermined torque imposed on one of said members of each device to control the passage of current to the electromagnetic means of said device; and means for effecting reengagement between said parts in all of said devices to reestablish the driving connection between all of the driving and driven members.

16. In apparatus for simultaneously rotating a plurality of threaded fastening elements: a releasable torque transmitting device for rotating each of said elements, each device including a driving member, a driven member, coengaging parts on said members effecting a rotatable driving connection therebetween, electromagnetic means for effecting disengagement between the parts of each device to completely interrupt the drive between said driving and driven members, means responsive to a predetermined torque imposed on one of said members of each device to control the passage of current to said electromagnetic means of such devices; said parts of all devices being disengaged at substantially the same torque transmitted through said one of said members; means for effecting reengagement between said parts in all of said devices to reestablish the driving connection between all of the driving and driven members; and means for increasing the predetermined torque at which all of said torque responsive means can control the passage of current to said electromagnetic means of all of said devices to effect disengagement between said parts following reestablishment of the driving connection between all of the driving and driven members.

17. In apparatus for simultaneously rotating a plurality of threaded fastening elements: driven means for each of said elements; driving means for each of said driven means coaxial of said driven means; clutch means on said driving and driven means releasably coupling said driving and driven means together, said clutch means being released when said driven means is subjected to a predetermined initial torque in tightening its associated threaded fastening element; means for holding each clutch means in disengaged position following its release; means for substantially simultaneously rendering said holding means ineffective and effecting reengagement of said clutch means to reestablish the drive between all of said driving means and driven means; and means for then holding each of said clutch means engaged until said driven means is subjected to a predetermined torque higher than said initial torque.

18. In apparatus for simultaneously rotating a plurality of threaded fastening elements: a releasable torque transmitting device for rotating each of said elements, each device including a driving member, a driven member coaxial of said driving member, clutch means on said driving and driven members releasably coupling said driving and driven members together, means responsive to a predetermined torque imposed on one of said members for effecting disengagement of said clutch means to completely interrupt the drive between said driving and driven members; said clutch means of all devices being disengaged at substantially the same torque transmitted through said one of said members; means holding said clutch means in disengaged position; means for shifting said devices longitudinally of their axes; and means responsive to shifting of said devices longitudinally of their axes to release said holding means and effect reengagement of said clutch means of all of said devices to reestablish the driving connection between all of the driving and driven members.

19. In apparatus for simultaneously rotating a plurality of threaded fastening elements: a releasable torque transmitting device for each of said elements and having disengageable means thereon for disrupting the turning effort to said elements when the torque transmitted exceeds a predetermined value; means for holding said disengageable means in disengaged position; means for advancing all of said devices relatively toward said elements to rotate the elements and tighten them to a predetermined extent; means for then relatively shifting all of said devices in a direction away from said elements to release said holding means and effect reengagement of said disrupting means; means for substantially simultaneously increasing the predetermined torque at which all of said disengageable means can disrupt the turning effort imparted to the elements; means for then relatively advancing said devices toward the elements to impart further tightening effort to the elements to tighten them to such predetermined higher torque value; and a timing mechanism for first initiating operation of said advancing means, then of said relative shifting means, then of said torque increasing means, and then of said advancing means.

References Cited in the file of this patent

UNITED STATES PATENTS

| Number | Name | Date |
| --- | --- | --- |
| 1,204,501 | Shipley | Nov. 14, 1916 |
| 1,578,232 | Ferris | Mar. 23, 1926 |
| 2,069,882 | Hall | Feb. 9, 1937 |